Feb. 10, 1970  J. N. MAGEE  3,494,325
SEALANT INJECTION TOOL
Filed March 15, 1967  3 Sheets-Sheet 1
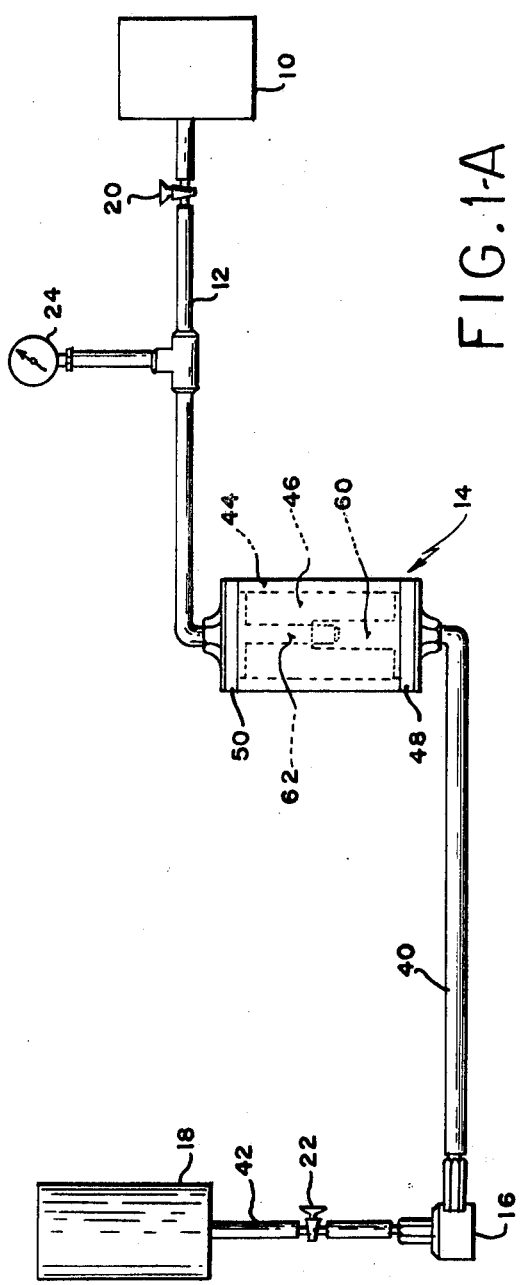
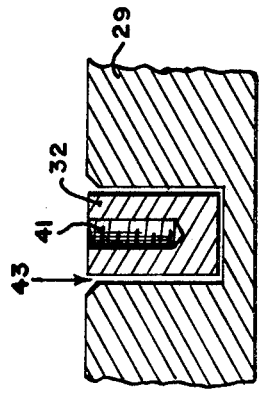
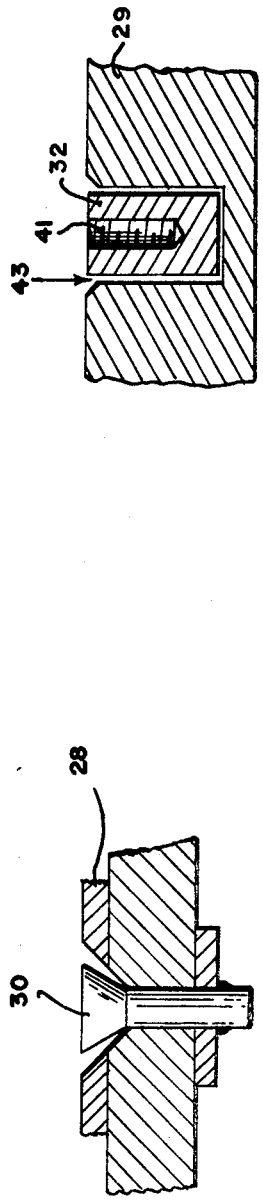
INVENTOR.
JOE N. MAGEE
BY *Harry A. Herbert Jr.*
*Ruth J. Codier*
ATTORNEYS

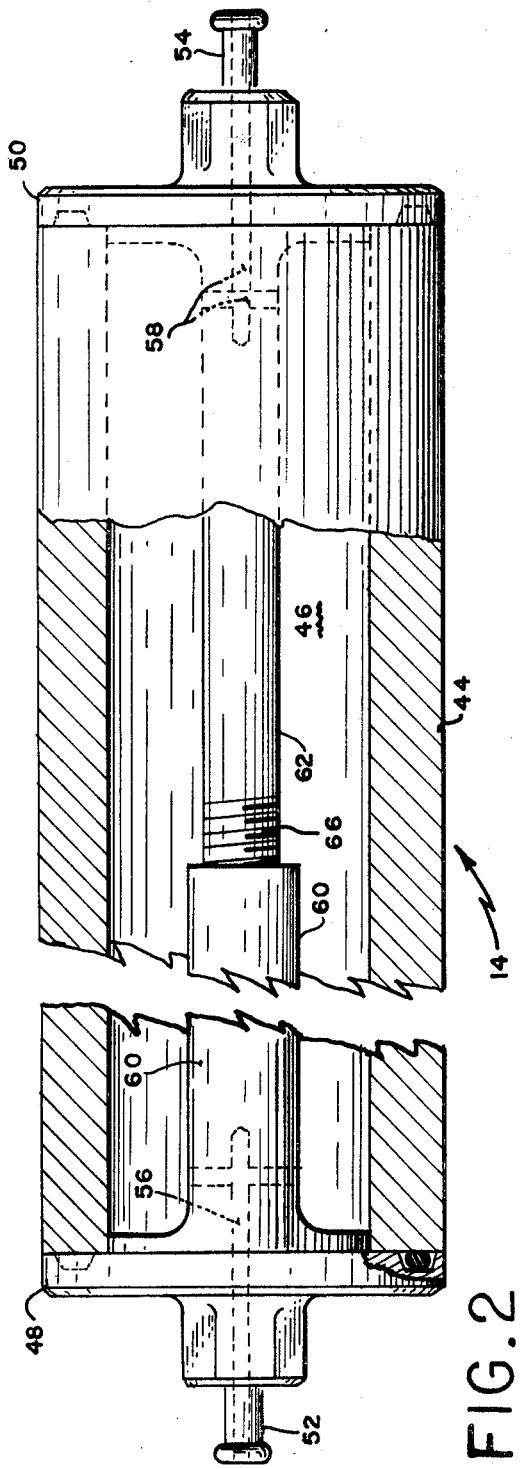
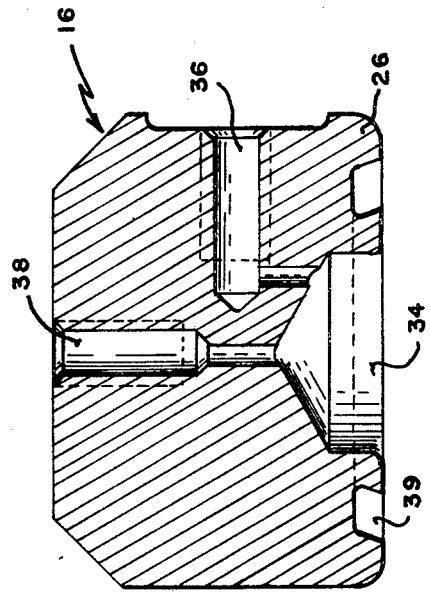
FIG. 2
FIG. 3
INVENTOR.
JOE N. MAGEE
BY Harry A. Herbert Jr
Ruth J Cadur
ATTORNEYS

# United States Patent Office 3,494,325
Patented Feb. 10, 1970

3,494,325
SEALANT INJECTION TOOL
Joe N. Magee, Oklahoma City, Okla., assignor to the United States of America as represented by the Secretary of the Air Force
Filed Mar. 15, 1967, Ser. No. 624,654
Int. Cl. C23c *13/08;* B05c *3/02*
U.S. Cl. 118—50                 1 Claim

ABSTRACT OF THE DISCLOSURE

A device for injecting sealant under differential pressure into interstices surrounding metal fasteners or plugs and comprising a sealing head, for airtight connection to the structure around the fastener, a sealant supply, a vacuum pump, a trap for protecting the pum and a ductive system provided with suitable cutoffs connecting these elements.

---

The invention relates to a sealant injection tool, and more particularly, to a tool for introducing sealant into the annular space existing around a tightly fitted fastener or plug used in aircraft structure between the fastener or plug and the aircraft structure itself. This is done at the location of the fastener or plug and without its removal.

In fasteners used in airplane construction, as well as in other applications, there arises the problem of corrosion, especially in countersunk steel rivets used in aluminum structures.

In such structures, galvanic action is likely to occur, especially when the fastener is countersunk, with the result that there is accelerated corrosion in aluminum air craft structure. Since space exists between the fastener and the structure, this space must be filled with sealant to preclude entrance of moisture and contaminants, and prevent galvanic corrosion and disintegration of the fastener and the aluminum structure receiving it.

Removing these factors for eliminating contaminants and introducing a sealant is an extremely laborious and time-consuming task.

There is much need for an instrument which can simultaneously remove air and introduce a sealant, without the necessity of removing the fastener. The methods presently available are (1) attempting to pour sealant into the space around the fastener, or (2) using pressurized means for forcing sealant into the space.

In the first method, air will be trapped and the hole will become air-locked. The second method is subject to the same objection, since air already present in the space is compressed in proportion to the magnitude of the pressure applied. When the pressure is released, the compressed pocket of air is also released and the compressed air may displace the sealant. In addition to these difficulties, there is the very real possibility of damaging aircraft structures, most especially aerodynamically designed surfaces.

The present invention seeks to provide a tool which will evacuate and then permanently fill the space with sealant, without removal of the fastener and without danger of damage.

Another object of the invention is the provision of a device which functions without the removal of a fastener or plug to eliminate air from spaces allowed between the fastener or plug and the aircraft structure receiving them, and thereafter filling the spaces with sealant.

A further object of the invention is the provision of a system for accomplishing the above-noted results, which system includes a vacuum pump for evacuating the space between the fastener and aircraft structure, a sealant supply, a connector and sealing head applied over the fastener, a sealant supply reservoir, a trap and a duct system with suitable cut offs connecting these elements.

These and other advantages, features and objects of the invention will become more apparent from the following description taken in connection with the illustrative embodiments in the accompanying drawings, wherein:

FIGURE 1A is a schematic representation of the system;

FIGURE 1B and 1C are cross sectional views of exemplary fasteners or plugs, respectively, on which the device may be used;

FIGURE 2 is a detail fragmentary cross sectional view of the trap;

FIGURE 3 is a cross sectional detailed view (enlarged) of the connector and sealing unit.

Figure 4:
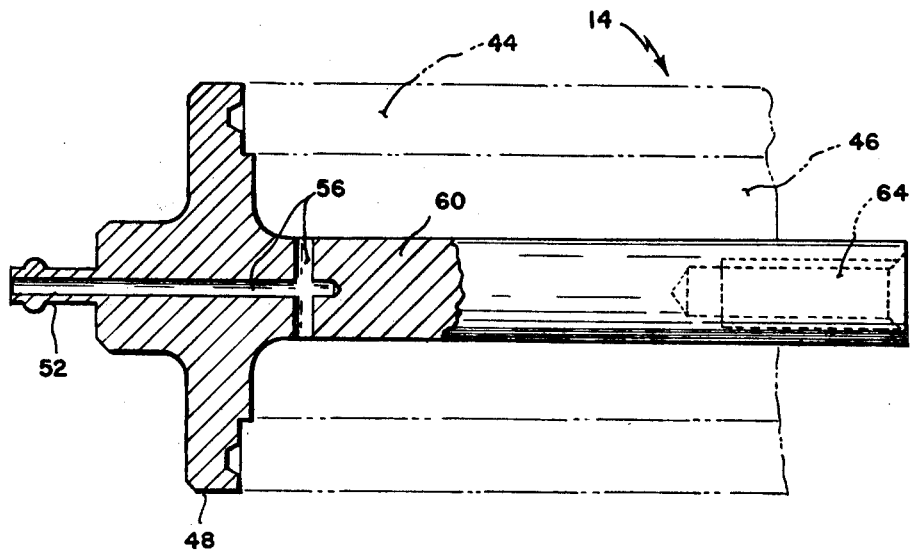
FIGURES 4 and 5 are fragmentary cross sectional views, respectively, of the top and bottom caps of the trap.

Referring more particularly to the drawing, a pump 10 to be used as a vacuum pump is connected by a hose or duct member 12 through a trap member 14 to a connector and sealing head 16, and through the connector and sealing head 16 to a reservoir 18, a source supply of sealant material. The system is versatile and capable of many adaptations. In the adaptation represented herein, the system operates with vacuum pressures of the order of 28 inches of mercury, which are registered and observed on the vacuum pressure gauge 24 connected with duct member 12. The reservoir 18 may operate at atmospheric pressure, or at other pressures as found expedient.

The selection of sealant material is important since the effectiveness of the system is a relative measure of the sealant's ability to penetrate small spaces. Its selection lies within the purview of the sealant injection tool operator. An example of a sealant found to be effective in many instances is the product EC1675, manufactured by the 3M Company. A stop valve 20 in duct member 12 cuts the pump 10 in and out of the system and a stop valve 22 in duct 42 between the reservoir 18 and connector and sealing head 16 cuts the sealant supply 18 in and out of the system, as desired. Whether the reservoir 18 is pressurized or operates at atmospheric pressure is immaterial, since it is the differential obtained that is effective for injecting the sealing fluid around the fastener.

FIGURE 1B illustrates a conventional countersunk rivet-type fastener while FIGURE 1C shows a plug 32, internally threaded at 41 for receiving an element, and the aircraft structure 29. The plug 32 is flush with the surface of structure 29 and requires a sealant material to be forced into the space 43 between it and structure 29 while the rivet-type fastener 30 would require sealant between it and the aircraft structural elements shown.

The connector and sealing head 16 for the system is shown in detail in FIGURE 3. The connector and sealing head body 16 is provided with a suitable sealing element portion 26, which is applied to the construction surface exemplified by numeral 28 of FIGURE 1B and 29 of FIGURE 1C, and is of such elastomeric material as will provide a seal on the surface area surrounding the fastener. Representative fasteners and plugs are shown at 30 and 32, respectively, of FIGURES 1B and 1C. The connector and sealing head 16 is concaved centrally, as shown at 34, and is provided with two ducts 36 and 38 adapted for connection, respectively, to the duct section 40 leading through the trap 14 to the pump 10 and the duct section 42 leading to the reservoir 18. FIGURE 3 also shows an annular recess 39 of the formation illustrated for improving the sealing action of element 26 in order to render an airtight connection with a construction surface.

The pump 10, valves 20 and 22 and the vacuum gauge may be of any desirable or standard form. Apart from the system, they form, individually, no part of the invention.

The trap 14 for the specific system performs the function of preventing entrance of sealant material into the pump which would be injurious and cause damage to the pump. The trap is of suitable material which is heat-treated to withstand the stress of pressure and vacuum.

Figure 5:
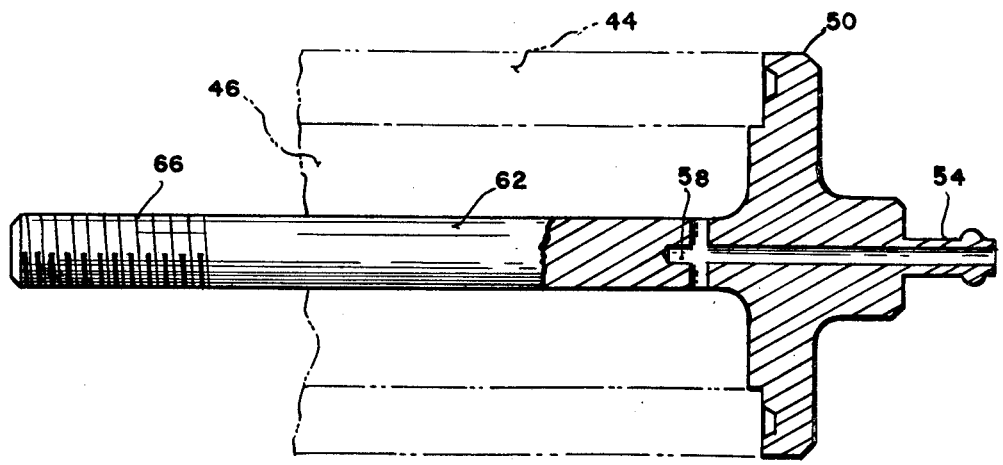

A trap body 44 is a hollow cylinder with a central cavity 46. A pair of caps 48 and 50 close the opposite ends of the cylinder 44 and provide communication and connecting means to ducts 12 and 40, respectively. As can best be seen in FIGURES 4 and 5, these connections are accomplished through connecting elements 52 and 54 and the T-shaped ducts 56 and 58, which are formed in the stud members 60 and 62, respectively. The stud members 60 and 62 extend inwardly from caps 48 and 50, are axially located and connect to each other by expedient means such as external and internal screw threaded ends 66 and 64.

If required, an O-ring (FIGURE 2) may be provided in the grooves in the end caps 48 and 50 in order to aid in sealing these elements to the trap body 44.

The operation of the tool is as follows:

(1) Valve 22 and 20 should be closed.

(2) The reservoir 18 is then filled with sealant material, for example, the aforementioned EC1675 manufactured by the 3M Company.

(3) The connector and sealing head 16 is placed over the head of the countersunk fastener or plug on the airplane structure.

(4) The vacuum pump 10 is started.

(5) Valve 20 is opened and the vacuum is pulled until the vacuum gauge 24 indicates about 28″ of mercury vacuum. The internal and external differential pressure causes the connector and sealing head 16 to be pressed to the airplane structure.

(6) Valve 20 should then be closed.

(7) Valve 22 is now opened in order to draw the sealant from the reservoir 18 to cover the fastener head and the space therearound.

(8) Valve 22 is closed (after about 15 seconds when the aforementioned sealant EC1675 of the 3M Company having a maximum viscosity of 13 poise is utilized). Any materials which are drawn toward the pump would be kept within the trap 14 by virtue of the fact that the inlet 56, through which the sealant comes, is considerably below the outlet 58 toward the pump 10. It is understood, of course, that the trap 14 should be emptied periodically to avoid its being filled and causing damage to the pump.

(9) The connector and sealing head 16 is removed from the structure and may be placed over the additional fasteners or plugs as indicated in step (3) to have steps (4) through (9) repeated for the new element to be sealed.

The device of the invention has great flexibility and a wide variety of applications. It will be apparent that although the device has been described in connection with aircraft fasteners and metal fasteners in general on metal structures, it is useful in many other environments.

I claim:

1. A device for evacuating the space between a tightly fitted element and a structure, clearing the space of dirt and debris and injecting a sealant into said space without removal of said element, said device comprising a pump for providing vacuum, a connector and sealing head member capable of sealed attachment to said structure in the surface area of said structure encompassing said element, a pair of independent duct means through said head, reservoir means for containing and dispensing sealant, means for providing selectively communication and non-communication between said pump and one duct in said head, means for providing selectively communication and non-communication between said reservoir and the other of said ducts in said head, and a trap interposed in said duct line between said pump and said head, for collecting said debris and preventing its entrance into said pump, said trap comprising a hollow cylindrical member, a first cap member and a second cap member for closing the ends of said cylindrical member, and a duct in each cap leading to the interior of said cylinder, said trap comprising a stud connected to each of said caps and extending inwardly into said cylinder, means for interconnecting said studs to form an axially located rod, and T-ducts in each of said studs for providing communication with said ducts in said caps, and means for releasably joining said stud elements to hold said caps in position against said cylindrical member, and duct means in said caps and stud elements for providing communication between the exterior and the interior ends of said cylindrical member.

References Cited

UNITED STATES PATENTS

| | | | |
|---|---|---|---|
| 2,997,880 | 8/1961 | Cook et al. | 137—592 X |
| 2,010,430 | 8/1935 | Howard et al. | |
| 2,070,039 | 2/1937 | Briggs. | |
| 3,354,917 | 11/1967 | Swanson | 141—59 X |
| 3,359,613 | 12/1967 | Rye | 29—460 X |

FOREIGN PATENTS

| | | |
|---|---|---|
| 422,525 | 1/1935 | Great Britain. |

LAVERNE D. GEIGER, Primary Examiner

EDWARD J. EARLS, Assistant Examiner

U.S. Cl. X.R.

29—460; 118—410; 141—59; 156—382; 264—90